Oct. 20, 1970       R. A. SMITH       3,535,566
INSIDE-OUT DYNAMO-ELECTRIC MACHINE
Filed Dec. 27, 1967                    2 Sheets-Sheet 1
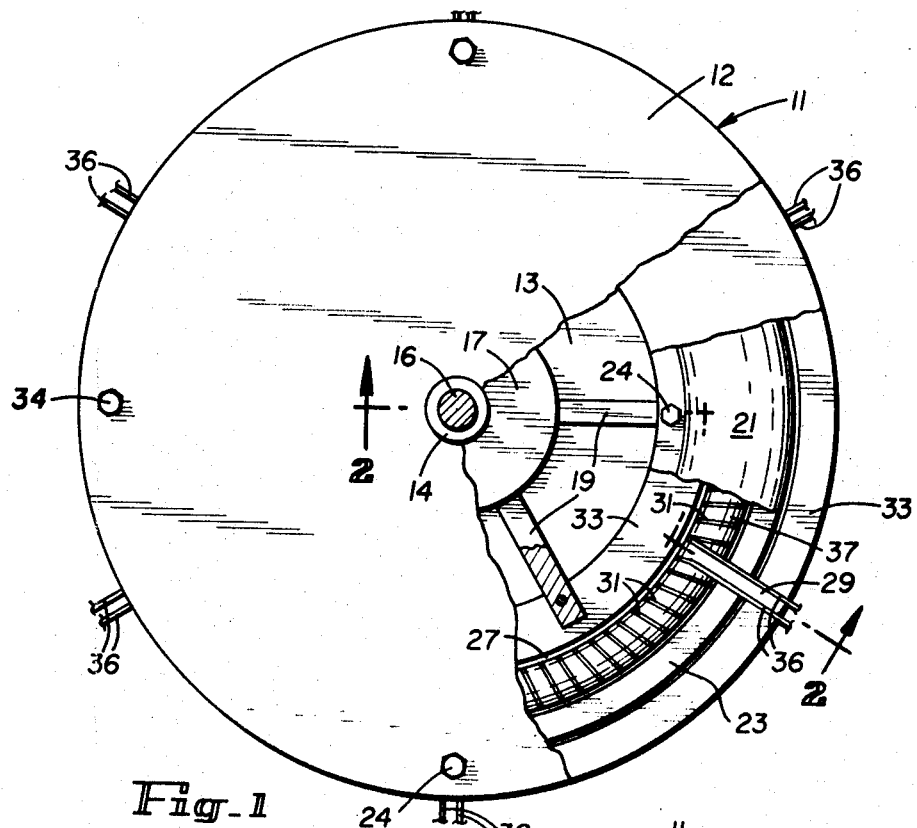
Fig_1
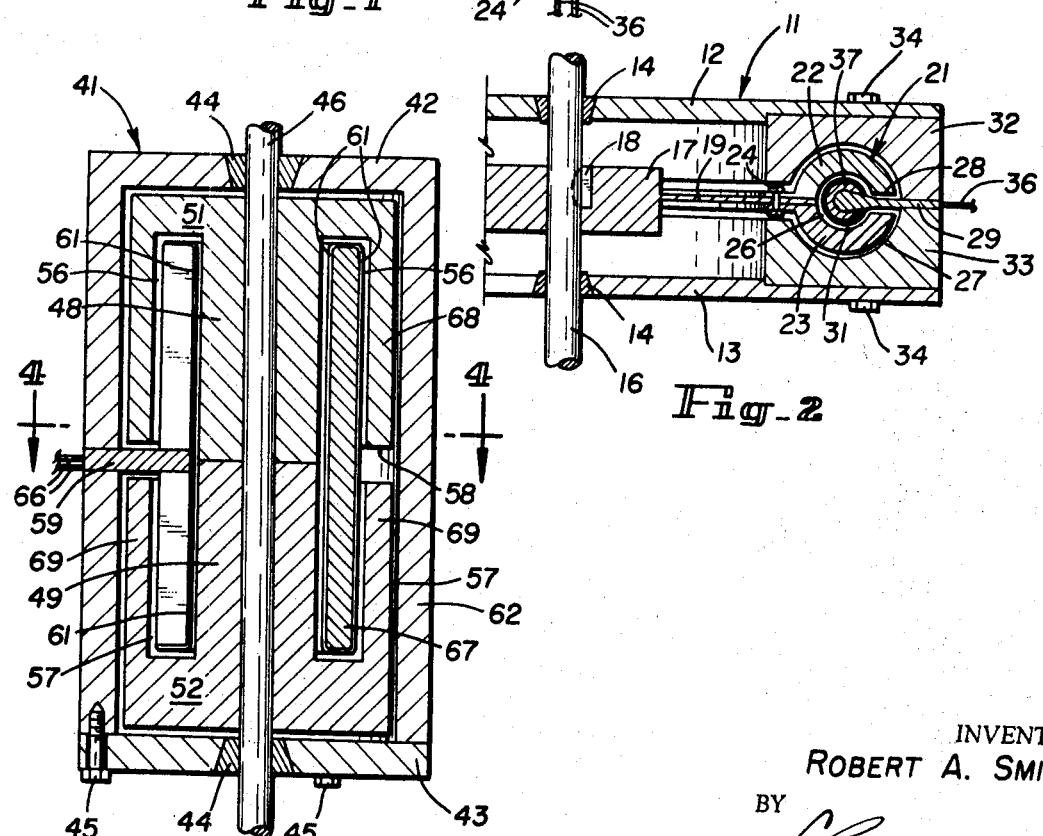
Fig_2
Fig_3
INVENTOR.
ROBERT A. SMITH
BY
Bessinger
ATTORNEY Oct. 20, 1970    R. A. SMITH    3,535,566
INSIDE-OUT DYNAMO-ELECTRIC MACHINE
Filed Dec. 27, 1967    2 Sheets-Sheet 2

INVENTOR.
ROBERT A. SMITH
BY
ATTORNEY

United States Patent Office 3,535,566
Patented Oct. 20, 1970

1

3,535,566
INSIDE-OUT DYNAMO-ELECTRIC MACHINE
Robert A. Smith, Rte. 2, Box 1114, Tower Trail,
El Paso, Tex. 79927
Filed Dec. 27, 1967, Ser. No. 693,916
Int. Cl. H02k 1/22
U.S. Cl. 310—67                                2 Claims

ABSTRACT OF THE DISCLOSURE

Dynamo-electric machines having rotor and stator components of various configurations which the electromagnetic or induced pole elements of one component substantially envelope and surround the electrically excited or induced pole elements of the other component with construction features permiting the design of units having a flat pancake or a conventional external shape. By reason of the enveloping design the surface area of the air gap between passing poles is increased making possible a corresponding increase in the electromotive lines of force. Embodiments providing a conventional shaft mount or a hollow center drive arrangement are presented.

BACKGROUND OF THE INVENTION

Dynamo-electric machines of current manufacture are usually of a conventional cylindrical external shape. Machines of this general type may be used as motors, generators, or for electromagnetic braking. Combination units for use as motors, generators or brakes are possible. Design differences permitting the various usages are well known in the are. All such machines usually comprise rotor and stator components with such components each having electrically excited or induced magnetic poles. Magnetic lines of force emanating from the respective poles serve to energize or brake the rotational movement or to induce an electric current in conductors provided by the machine. In order to change the characteristics of the magnetic force distribution, different machine configurations have previously been used. Where a flat motor design was desired, the rotor and stator components have previously been arranged in a flat disk configuration for operation in side by side relationship in place of the conventional concentric disc-positions. When measured against such prior art in dynamo-electric machine configurations, the present invention is intended to provide a design configuration of greater efficiency and torque capacity, since the pole elements of the rotor components can substantially surround the pole elements of stator components. An opposite configuration or a configuration in which the stator or rotor components surround and are surrounded is also possible.

SUMMARY OF THE INVENTION

Briefly stated, the present invention provides a design configuration of dynamo-electric machines in which rotor or stator components are configured to substantially surround one another. Coils and windings may be provided to excite pole elements of the stator or rotor and/or the components may be presented in segments for the establishment of induced poles during operation of the machines. The designs permit the establishment of magnetic flux distribution patterns over an extended surface area and across air gaps of correspondingly increased

2 area. The design torque values can correspondingly be increased by reason of such enveloping design and further by reason of the overall machine configurations possible. The unit cooling characteristics can likewise be improved by reason of such configuration to additionally contribute to improved operating efficiencies.

The foregoing statement of features present the main objects of the invention. A further object of the invention is to provide distinctive machine configurations inclusive of a flat pancake shaped unit having high torque characteristics or units that may be disposed about a hollow center for external drive usage. Further objects and advantages of the present invention will be apparent from the appended description and drawings.

BRIEF DESCRIPTION OF THE DRAWINGS

FIG. 1 is a view taken along the axis of rotation with parts shown in broken section, FIG. 2 is a cross-sectional elevation taken along the broken line 2—2 of FIG. 1, FIG. 3 is a cross-section or view of a second embodiment of the invention with the section being taken along the broken line 3—3 of FIG. 4.

DESCRIPTION OF THE PREFERRED EMBODIMENTS

Figure 4:
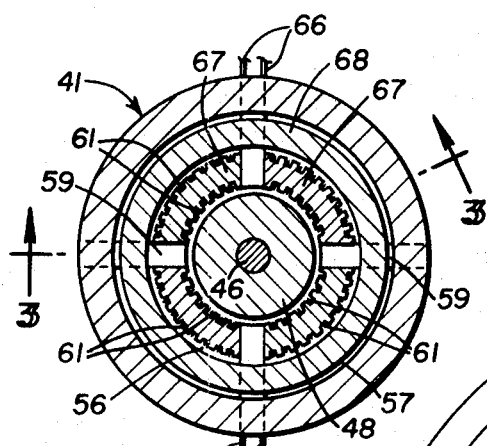
FIG. 4 is a cross-sectional view taken along the line 4—4 of FIG. 3.

For the embodiment shown in FIGS. 1 and 2 the electric motor or electromagnetic machine 11 has a flat disk cylindrical external shape largely defined by the end plates 12 and 13 of a housing structure. The end plates provide bearings 14 adapted to receive and rotatably support a drive shaft 16. A hub 17 positioned centrally with respect to the end plates 12 and 13 is secured to the shaft 17 by a key element 18 or other means. A plurality of radial arms or spokes 19 are disposed outwardly from the hub 17 to provide support for rotor components of the motor. A disk or other type of support structure could alternately be provided. Specifically, the spokes 19 support rotor segments 21, which, as in the illustrated embodiment, may be made up of separate rotor segment halves 22 and 23 that are bolted or otherwise joined together. As illustrated, the bolts 24 may be extended through the spokes 19 to secure the individual rotor segments 21 to the rotating spokes, hub and shaft. When assembled, the segment halves 22 and 23 provide a structure having a central tunnel opening 26 and an outer surface 27 of torus shape. Considering the separate segments 21 as a part of a circumferentially disposed whole, the construction could be described as a segmental, hollow torus shape. The composite hollow torus segments 21, however, each provide a slot opening 28 at the outermost position which communicates with the inner tunnel opening 26.

When the described rotor components, inclusive of the shaft, hub, spokes and torus segments, are positioned within the housing, a stator coil support 29 extends through the outer slot 28 to provide support for the coil windings 31, which are also of segmental construction to be coupled in the electrical circuit of the machine as separate members in a manner corresponding to the connections for windings of conventional motors. The stator coil supports 29 are themselves supported by stator or frame elements 32 and 33. These elements are secured to the end plates 12 and 13, respectively, by bolts or cap screws 34 in such manner that the pieces 32 and 33 or at least a part thereof may be made a part of the enclosing case for the unit 11. In order to sequentially energize the individual coil windings 31, electrical input leads 36 are provided to each wire end of each coil 31. The stator coil supports 29 can be formed to provide an entrance channel for the required electrical leads 36. Where desirable, the same coil supports 29 can also hold and properly position an iron core 37 disposed within the coils 31.

Since machines to be provided in the prescribed form are intended for electromagnetic uses, many of the described components can and perhaps should be made of laminated form. The rotor segment halves 22 and 23, the iron core 37 and all or a portion of the frame element components 32 and 33 could be of laminated construction with lock elements being provided to hold the laminated construction in its described and desired configuration. The laminations are, of course, used to minimize eddy current losses within the machine and to provide dynamoelectric machines having good performance characteristics.

The enveloping type of construction illustrated in which the coil windings 31 of the stator components are surrounded by the hollow torus formed rotor components which are in turn closely surrounded by the additional stator elements 32 and 33 establishes beneficial patterns for the lines of force within the machines. The described and illustrated configuration has a further advantage, inasmuch as the increased surface area for the pole elements will permit efficient operation with lower flux densities. This feature and the increased surface area itself can contribute to more efficient cooling for the machine components themselves. With more efficient cooling the overall weight of materials used in construction can be reduced, and likewise savings could also be made in the design of bearings and conductors for such units. For machines that are to be used for dynamic braking purposes, the design offers inherent improvements, inasmuch as the air gaps between rotor and stator components can be of relatively large cross-sectional area with the gap itself being of narrow width.

While a center bearing support is shown in connection with this first embodiment, the configuration is well adapted to provide a construction having a hollow center. For such modification the bearings would be of large diameter to be supported by the frame elements 32-33.

A modified form or second embodiment of the invention is shown in FIGS. 3 and 4. This modified construction has a more conventional exterior shell form than the flattened cylindrical disk form previously described. In this modification the shaft 46 is supported by bearings 44 in a housing 42. The housing component 42, together with an end plate 43 that is bolted thereto by use of bolts 45, provides an enclosure for the machine 41 and a rotating support for the shaft 46 and the rotor components disposed thereon. In this configuration no central hub or spokes are provided. A part of the functional utility of such components is assumed by the central boss portions 48 and 49 of the rotor cup segments 51 and 52. The central bosses support the rotor cup segments 51 and 52 on the shaft 46 for rotation within the housing. The cup shells 68 and 69 are of lesser height or length than the central bosses 48 and 49 thereby providing a slot 58 through which a coil support 59 is extended inwardly from the housing element 42. The supports 59 provide support for segment coils 61 that are positioned and disposed within the tunnel opening 56 provided by the described construction. As in the previous embodiment, the cup segments 51 and 52 rotate within the case, and a gap 57 is provided therebetween. In this construction the case 42 or at least the cylindrical barrel thereof 62 can be utilized to provide a stator frame.

The coil windings 61 have their longer lengths disposed in lines parallel to the shaft 46 with the same windings extending the full length of the composite tunnel openings 56 provided by the separate cups 51 and 52. In the assembled machine 41 the coils 61 will again be substantially surrounded by the rotor components, inclusive of the cup shells 68 and 69 and the hubs 48 and 49. Accordingly, in this configuration the cup segments 51 and 52 are comparable to the torus segments 21 and 22 which surround the coils 31. The coil supports 59 can again provide access for electrical input leads 66 and support for an iron core 67, as shown, where required.

Figure 5:
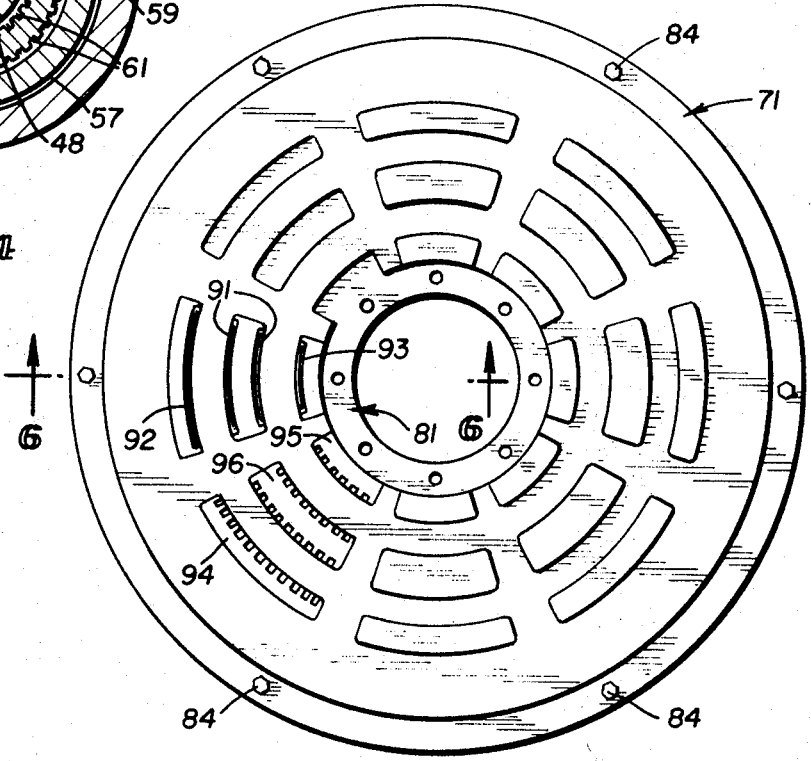
FIG. 5 is a view taken along the axis of a third embodiment of the invention with elements shown in broken section.
Figure 6:
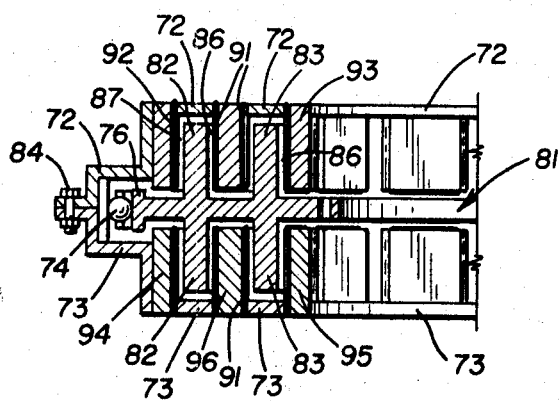
FIG. 6 is a cross-section taken along the line 6—6 of FIG. 5.

In a third embodiment of the invention shown in FIGS. 5 and 6, the dynamo-electric machine 71 is disposed within the confines of top and bottom plate and case elements 72 and 73. The unit is provided with an exterior support bearing 74 which is mounted between the bearing case and a bearing flange 76. Due to the use of an exterior bearing the machine can have a hollow or open center, and, accordingly, the machine is adapted for disposition about tube or shaft elements for externally powering the rotation of such elements. The hollow center rotor assembly 81 is fabricated to provide an outer rotor segmental flange 82 and an inner rotor segmental flange 83. The concentrically disposed flanges 82 and 83 positioned on opposite sides of the rotor 81 provide circumferential channels therebetween, within which pocket coil segments 91 may be positioned. Additionally, outer coils 92 and inner coils 93 may be used to effectively surround the inner and outer rotor segments 82 and 83. All of the coil segments 91, 92 and 93 may be provided with iron cores 96, 94 and 95, respectively.

With the described construction the coils 91, 92, 93 are designed and fabricated to be inserted through provided openings in the top and bottom plates 72 and 73 into their respective pockets that are disposed in non-interfering position with respect to the outer and inner rotor segments 82 and 83. These pocket coils are, accordingly, all positioned in near contacting relationship with the rotor components. It should be noted, however, that the pocket coils 91 and their iron cores 96 are substantially surrounded by elements of the rotor 81. The coil 91 has at least three of its four sides adjacent to or surrounded by rotor components.

Accordingly, this third embodiment is similar to that presented in the other embodiments, inasmuch as the stator coil windings are substantially surrounded by rotor components. In all of the presented designs, the surface area of pole elements is substantially increased.

While separate embodiments of the invention have been shown and described, it should be apparent that the invention is adaptable to various modifications and changes. All adaptations coming within the scope of the appended claims are considered to be a part of this invention.

I claim:

1. A dynamo-electric machine comprising electromagnetic stator components disposed outwardly and away from the central axis of rotation for said machine, rotor components mounted for rotation with respect to said stator components, said rotor components being inclusive of operative electromagnetic elements and rotary support elements with the electromagnetic elements being disposed outwardly from the central axis of rotation for said machine and in position adjacent said electromagnetic stator components, said electromagnetic components providing separated magnetic pole segments and said rotor components providing a formed enclosure for substantially surrounding a major portion of the pole segments of the stator component, and coil windings of circular cross-section for said stator component magnetic pole segments disposed within said machine in a torus form.

2. Structure as set forth in claim 1 and further comprising rotor pole segments of hollow torus form substantially surrounding said stator coil windings.

References Cited

UNITED STATES PATENTS

| | | | |
|---|---|---|---|
| 2,880,616 | 4/1959 | Aumuller | 44—5.7 |
| 2,653,481 | 9/1953 | Mathiesen | 74—5.37 |
| 2,857,534 | 10/1958 | Beach | 310—67 X |
| 2,914,688 | 11/1959 | Matthews | 310—178 |
| 3,354,333 | 11/1967 | Henry-Baudot | 310—267 X |

DONOVAN F. DUGGAN, Primary Examiner

U.S. Cl. X.R.

310—266, 267